Aug. 23, 1938.  W. L. SCHMITZ  2,127,758
INTERNAL COMBUSTION ENGINE
Filed Jan. 4, 1936   2 Sheets-Sheet 2

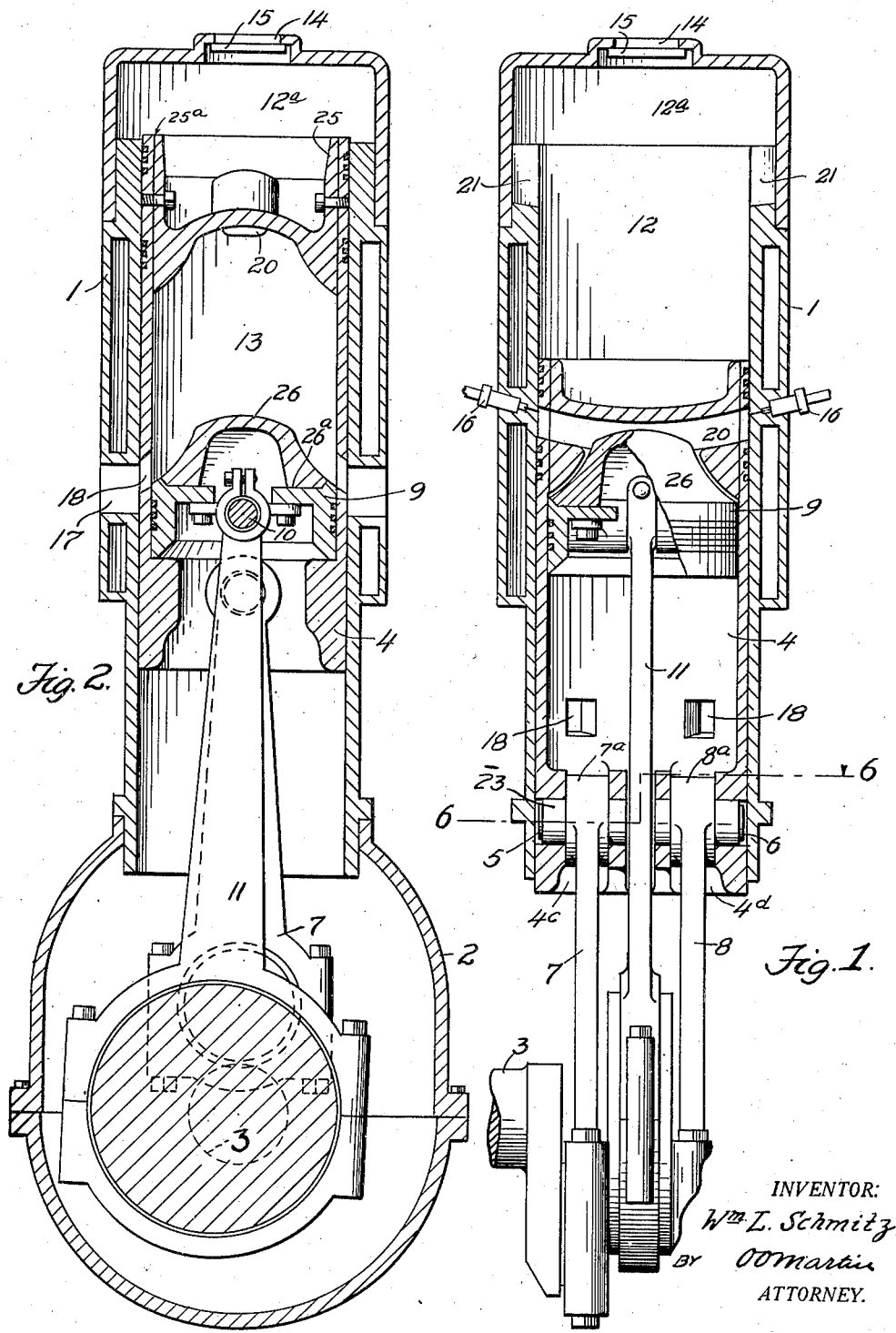

INVENTOR:
Wm L. Schmitz.
BY O. O. Martin,
ATTORNEY

Patented Aug. 23, 1938

2,127,758

UNITED STATES PATENT OFFICE 2,127,758

INTERNAL COMBUSTION ENGINE

William L. Schmitz, Los Angeles, Calif.

Application January 4, 1936, Serial No. 57,533

15 Claims. (Cl. 123—50)

The present invention has relation to internal combustion engines and has particular reference to two cycle engines of the compression ignition type, in which each cylinder is provided with two pistons, one fitted to move axially within the other.

Many attempts have been made to produce engines of the type referred to combining a minimum of scavenging losses with a maximum of thermo efficiency, but such attempts have, so far as I have been able to ascertain, not been successful. It is an object of the present invention to provide an engine of the type considered in which the scavenging of the exhaust gases is completely and thoroughly effected. It is a further object of the invention to provide an engine capable of attaining a high degree of thermo efficiency.

One of the problems in designing engines of this type which, so far as I know, has not been satisfactorily solved, is to relieve stresses at the moment of greatest impact or pressure. It is an object of the invention to provide an engine in which the two pistons of each cylinder are relatively so positioned as to relieve such dead center strains.

Another problem encountered in engines of the double piston type is that of finding room for the connecting rods from the pistons to the crankshaft. It is a further object of the invention to provide means whereby the connecting rods may be placed close enough together to come within the larger of the two pistons and yet have ample strength to resist all stresses and at the same time be well balanced.

Figure 5:
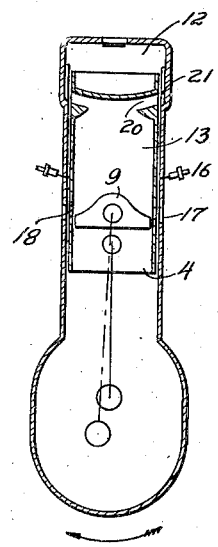
Figure 4:
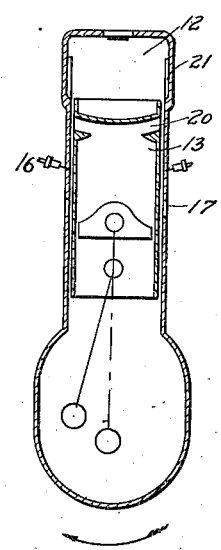
Figure 3:
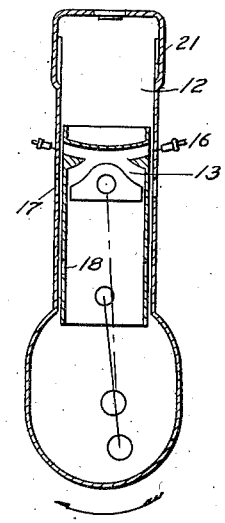
Figure 6:
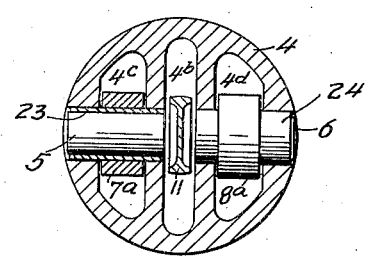
Figure 7:
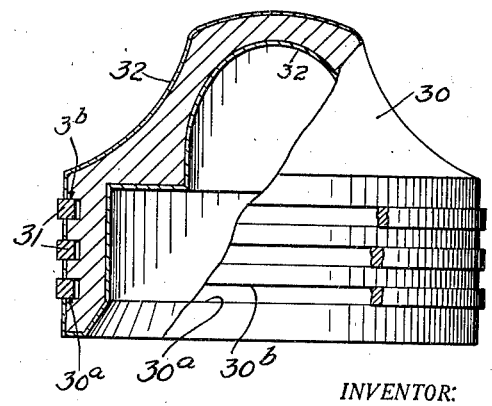

These and the further objects and advantageous features of the invention are hereinafter fully described and illustrated in the appended drawings, of which:

Fig. 1 is a side elevation, partly in section, of a device embodying the invention, Fig. 2 is a substantially corresponding end elevation of the device, Figs. 3, 4 and 5 show, diagrammatically, various positions of the pistons of the device, and Figs. 6 and 7 are detail views of the piston heads.

The structure of the invention, in the form illustrated in the drawings, comprises a cylindrical casing 1, fitted at the bottom to receive a crankcase 2, within which a crankshaft 3 is mounted to rotate. For the sake of simplicity, only one cylinder unit is here illustrated, but I wish it understood that as many units may be added as may be required for a particular purpose.

A piston 4 is fitted to slide within the cylinder casing, and it is shown made at the bottom with a transverse bore in which wrist pins 5 and 6 are securely held in any suitable manner. A pair of piston rods 7 and 8 operatively connect these wrist pins with the crank shaft. Within the piston 4 is provided a cylindrical chamber of a size to receive a second piston 9, and the latter is shown fitted with a wrist pin 10 from which a piston rod 11 extends to the crank shaft intermediate the piston rods 7 and 8.

One advantage of the double piston construction is that a pre-scavenging compression chamber 12, 12$^a$ is provided above the piston 4 and that a combustion chamber 13 is formed between the heads of the two pistons. The air from the chamber 12, 12$^a$, having first become compressed, is used to expel the exhaust gases from the combustion chamber. In the top of the casing is provided an intake port 14, in which a check valve 15 is seated to admit air to the chamber 12, 12$^a$, and the casing is shown perforated to receive fuel jets 16. Exhaust ports 17 are cut into the casing below these jets for registration with exhaust ports 18 of the piston 4.

The relation of chamber 12, 12$^a$ to chamber 13 is most important, for reasons which will now be explained. The air drawn into the chamber portion 12 becomes displaced by the piston 4 and mixed and compressed with the air within the chamber portion 12$^a$. When completely compressed, this air is free to pass through the ports 20, 21 into and through the combustion chamber and out through the exhaust ports 17, 18. But it is noticed that only a quantity of air equal to the air volume of chamber portion 12 passes out, the rest remains within the upper portion 12$^a$. The air volume of the portion 12 may conveniently be termed the piston displacement volume. In view of this, it is seen that, in order properly to scavenge the combustion chamber, the piston displacement volume must be at least as great as the combustion chamber volume. In fact, in actual engineering practice, it has been found that the ratio of the piston displacement volume to the maximum volume of the combustion chamber should be about one and two-tenths to one. If the volume of the combustion chamber is increased, there will not be sufficient air within the chamber portion 12 for thorough scavenging.

The pressure required to force the air through the combustion chamber, within the time available, is also important. This pressure will vary with the size and speed of the engine but, in the average automobile engine, rotating at from 1000 to 1500 R. P. M., the pressure should be about four and one-half pounds. From this it follows that the chamber portion 12a must be proportioned to attain the correct pressure. If it is too large, the pressure will be insufficient. If too small, too much engine power will be consumed in scavenging.

These relations having been established, it follows that chamber volumes and piston strokes must be proportioned to produce this degree of pre-scavenging pressure. And it is also essential that the various ports be properly proportioned and positioned, all of which will be explained presently. Some designers of engines of this type have proposed to vary the angular relation of the cranks on the crankshaft, and others have suggested to shorten the stroke of one piston relative to the other in an effort to obtain efficient valve functioning and complete scavenging, but careful tests indicate that such proposals fail to produce compression conditions and scavenging results essential to the successful operation of an engine of the type here presented.

After much study, planning and plotting of charts, I arrived at the conclusion that the ratio of piston stroke must be approximately one-fourth to one, and that the movement of the short stroke piston should follow about ninety degrees behind that of the other piston. If the piston ratio is changed to increase the short piston stroke, it is found that the length of the combustion chamber must be increased, thereby increasing its volume, and that, for this reason, insufficient compressed air is present in the chamber 12 completely to scavenge the combustion chamber and in addition to furnish the volume air required for most efficient combustion. It may be suggested to enlarge the compression chamber accordingly but, as the stroke of the long stroke piston remains unchanged, the necessary degree of compression will not then be attained. In fact, I have found that, gradually to increase the short piston stroke only serves correspondingly to lower the efficiency of operation and furthermore that, below the ratio of one-fourth to one and above the ratio of one-third to one, the engine will not function properly.

Two important reasons for permitting the short stroke piston to trail the other piston will now be explained. For one thing, this relation has the advantage of cushioning the shock on the crankshaft at the time the combustion takes place, because the short stroke piston then will have started on its downstroke while the other piston passes the dead center. But of even more importance is the resulting improved functioning of the valve mechanisms, as will appear from the following description, reference being also invited to the drawings which illustrate the positions of the pistons relative to the various ports.

In Fig. 3, the long stroke piston 4 is down and approaching the dead center. The short stroke piston 9 is up but has already commenced its downward travel. Ports 20 of the piston 4 have, at this moment, reached the fuel jets 16 and the combustion takes place. And, as the piston 9 is on its downstroke, the immediate expansion of the chamber 13 helps to cushion the combustion impact on the crankshaft.

The two pistons now continue to draw apart until the piston 9 reaches and passes dead center, as indicated in Fig. 4. At this time, it is seen that the exhaust ports 18 reach the ports 17, permitting the scavenging to commence. But piston 4 continues its upstroke to bring its ports 20 into registration with grooved passages 21 of the casing. While the piston 4 is still rising to reach full registration of these ports, as indicated in Fig. 5, it is seen that the exhaust ports remain in registration and that, for this reason, fresh charge from the compression chamber 12 is admitted through the passages 21 thoroughly to scavenge the combustion chamber.

The piston 9 continues its upstroke and piston 4 has commenced its downstroke, and these movements continue until piston 9 closes the exhaust ports 18. But the inlet ports 20, 21 still remain in registration long enough to permit the full charge to enter the combustion chamber. The pistons continue to draw together until the position of Fig. 1 is reached, at which time the charge within the combustion chamber is completely compressed and the fuel jets are brought into registration with the ports 20.

As stated, the short stroke piston 9 should lag behind the piston 4 about ninety degrees. If it is gradually brought closer to piston 4, it is found that, while the strain on the crankshaft may be slightly lessened at the time of the combustion, because the short stroke piston then will have come closer to the middle of its stroke, it is also found that gradually the exhaust valve fails to open sufficiently to permit complete scavenging. Furthermore it is found that the movement of the piston 9 relative to the other piston gradually decreases, as a consequence of which the proper compression within the combustion chamber is not attained. If, on the other hand, the piston 9 is adjusted to lag more than ninety degrees it follows that the length of its stroke, relative to the other piston, increases, causing the two pistons to become jammed together and the engine to stop. Lengthening this chamber to provide clearance would, as above stated, result in incomplete scavenging.

In the foregoing, I have endeavored to show the importance of establishing the proportions and relations described. Deviation from these will result not only in increasing the height of the cylinder, but also in sacrificing necessary volume ratio between the two chambers. Any competent designing engineer can readily plot curve charts to demonstrate the correctness of the foregoing.

One difficulty encountered in the design of double piston, three piston rod cylinders is the provision of proper support for the crankshaft and space for attachment of the piston rods to the pistons. Three cranks take up so much room that it almost becomes necessary to mount the outer piston rods on the outside of the outer piston with the result that, in multi-cylinder engines, the cylinders are spaced too far apart and the crankshaft is weakened for lack of sufficient support between the cranks.

In order to overcome this difficulty, it may be preferable to mount the inner piston rod 11 on an eccentric 30, whereby it is possible to move the three rods close enough together to find room for them within the outer piston and to provide a short and powerful crankshaft. It is also necessary to carry the inner piston rod around the wrist pin of the long stroke piston, or the latter may be made in two parts, as shown in the drawings, to leave clear space in the middle for the passage of the piston rod.

Where such two-piece wrist pin is employed, it becomes necessary to provide bearings for both ends of the pins, and this may be accomplished in the following manner, reference being particularly invited to Figs. 1 and 6. The piston 4 is here shown made in the form of a casting, into which a cylindrical bore 4ª, is sunk, of a size to accommodate the piston 9. The bottom of the casting is molded with a long narrow central opening 4ᵇ, to provide clearance for the inner piston rod 11, and with openings 4ᶜ, 4ᵈ to receive the heads 7ª, 8ª of the outer piston rods. The casting is thereupon transversely perforated and the wrist pins 5, 6 are tightly fitted into this bore. Bushings 23, 24 may also be provided to follow general automotive practice. In such manner, it is seen that a light and strong piston shell may be provided, giving ample support for the two wrist pins and affording clearance for the central piston rod.

It is desirable, in engines of the type considered, that heat be conserved within the combustion chamber at the time of the combustion to insure complete combustion, and that heat be dissipated through the piston walls when the combustion is completed. With this in view, it is convenient to mount within the top of the piston casting 4 a piston head 25, made from some heat conducting material such as aluminum, which is covered by some heat resisting material, such as aluminum oxide, except along the surface 25ª which contacts the piston wall. The piston 9 is preferably made from a casting also and it is similarly provided with a cap 26, also made with such heat insulating covering.

The combustion takes place between the two heat insulated parts 25, 26 which, on account of very low heat absorption, aid in obtaining complete combustion. But such small amount of heat as may be absorbed by these parts and the heat which strikes the piston walls as the pistons travel away from each other following the combustion is quickly dissipated through the piston and cylinder walls.

If, however, it is preferred to use a one-piece piston, and to oxidize its surface for heat resisting purposes, it is necessary to provide some means of heat dissipation. Fig. 7 shows, on a larger scale, a portion of an inner piston 30 which, in this case, is made from a single casting, the surface of which has been subjected to such anodic treatment to provide a heat resisting skin 32. It is shown made with annular grooves in which piston rings 31 are seated. The sides, 30ª, 30ᵇ, of these grooves, have been recut to remove this surface oxidation, thereby to permit such heat as may be absorbed to flow through the piston rings and the outer piston wall to the cylinder casing. The outer piston may, of course, be similarly treated. The highest efficiency is attained where the piston head is made from light material on which is deposited, by electroplating or spraying, a layer of material of high conductivity, such as copper or a copper alloy, and the surface then covered with a skin of porcelain surface is not only heat insulating but also highly carbon resisting.

The drawings are merely illustrative of the invention and no attempts have been made properly to proportion the parts. And I reserve the right to make such modifications as will come within the scope of the appended claims.

I claim:

1. In an internal combustion engine, a cylinder, a piston slidable within said cylinder, a second piston slidable within the first piston, a crankshaft, and connecting rods from said pistons to the crankshaft, the cranks on said shaft being proportioned to impart substantially one-fourth the stroke of the first piston to the second piston, the angular relation of the cranks being arranged to cause the short stroke piston to follow substantially ninety degrees behind the long stroke piston.

2. In an internal combustion engine having each cylinder fitted with two pistons, one slidable within the other, a crankshaft proportioned to impart full cylinder stroke to the outer piston and substantially one-fourth of said stroke to the inner piston, the angular relation of the cranks on the shaft being arranged to cause the inner piston to follow substantially ninety degrees behind the outer piston.

3. In an internal combustion engine, a cylinder, a piston slidable within said cylinder, a second piston slidable within the first piston, a crankshaft proportioned to impart about one-fourth the stroke of the first piston to the second piston, there being above the first piston a chamber the piston displacement volume of which is somewhat greater than the maximum volume of the space between the piston heads, the movement of the second piston being arranged to follow substantially ninety degrees behind that of the first piston.

4. In an internal combustion engine, a cylinder, a piston slidable within said cylinder, a piston slidable within said first piston, a crankshaft, piston rods from said pistons to cranks of said shaft, the cranks of the shaft being proportioned to impart about one-fourth the stroke of the outer piston to the inner piston, there being above the outer piston a chamber the piston displacement volume of which is about two-tenths greater than the maximum volume of the space between the piston heads, the cranks of said shaft being angularly positioned to cause the inner piston to follow substantially ninety degrees behind the outer piston.

5. In an internal combustion engine, a cylinder, a piston within said cylinder, a piston within said first piston, a crankshaft, an eccentric on said shaft, a strap operatively connecting said eccentric to move said inner piston, cranks on each side of the eccentric, and piston rods from each crank to the space within said outer piston, the latter being internally shaped to receive said rods and to afford said eccentric strap freedom of movement between said piston rods.

6. In an internal combustion engine, an outer and an inner piston within each engine cylinder, a crankshaft, an eccentric on said shaft, a crank on the shaft on each side of the eccentric, and connections from said eccentric and cranks to the pistons, all of said connections being placed within said outer piston.

7. In an internal combustion engine, an outer piston comprising a cylindrical shell having a bottom made with three perforations side by side and a transverse bore through the walls of said perforations, an inner piston slidable within said shell, a crankshaft, a connecting rod passing from said shaft through the central perforation of said bottom to the inner piston, wrist pins seated in said bore on each side of said central perforation, and connecting rods from the crankshaft seated on said wrist pins within the outer perforations of said bottom.

8. A piston comprising a cylindrical shell and a bottom made with a central and two side perforations and having a transverse bore through the walls of said perforations, and wrist pin seated in said bore on each side of said central perforation.

9. In an internal combustion engine, a cylinder, a piston slidable within said cylinder, a second piston slidable within said first piston, the strokes of the two pistons being proportioned to produce a piston displacement volume above the outer piston when the latter is in its lowermost position substantially two-tenths greater than the maximum space between the two pistons.

10. In an internal combustion engine, a cylinder, a piston slidable within said cylinder, a second piston slidable within the first piston, a crankshaft, connecting rods from said shaft to the said pistons, the strokes of the two pistons being proportioned to produce a displacement volume above the outer piston when the latter is in its lowermost position somewhat greater than the maximum space between the two pistons.

11. In an internal combustion engine, a cylinder, a long stroke piston slidable in said cylinder, a short stroke piston slidable within the first piston, the strokes of the two pistons being proportioned to produce a piston displacement volume above said long stroke piston when the latter is in its lowermost position somewhat greater than the maximum space between the two pistons.

12. In an internal combustion engine, an open top cylinder having an annular external seat at the top, a piston slidable in said cylinder, a second piston slidable within the first piston, the displacement volume of the cylinder space above the first piston when the latter is in its lowermost position being somewhat greater than the maximum volume between the two pistons, a cap mounted on the seat to close the top of the cylinder and to produce a chamber above the cylinder of a size to produce sufficient pressure completely to scavenge the space between the pistons, the cylinder wall having interior recesses extending downward from said chamber, and ports in said first piston for registration with said recesses when said piston reaches top position.

13. In an internal combustion engine, a cylinder, a long stroke piston slidable within said cylinder, a short stroke piston slidable within said first piston, a crankshaft, cranks on said shaft having rods connecting with said long stroke piston, an eccentric on the shaft intermediate said cranks having a strap connecting with the short stroke piston, a compression chamber above said long stroke piston, and ports in the latter for registration with said chamber.

14. In an internal combustion engine, a cylinder, a piston in said cylinder, a second piston within said first piston, the parts combining to form a cylinder chamber above said first piston when in its lowermost position and a piston chamber between the heads of the two pistons when farthest apart, there being a compression chamber above said cylinder and a passage from said compression chamber through the head of the first piston into said piston chamber when the piston heads are farthest apart, the strokes of the two pistons being proportioned to produce a piston displacement volume in said cylinder chamber somewhat greater than the volume of the said piston chamber, the volume of said compression chamber being of a size to produce sufficient compression completely to scavenge said piston chamber through the said passage and ports in the cylinder wall.

15. In an internal combustion engine, a headless cylinder, a piston in said cylinder, a second piston within said first piston, the parts combining to form a cylinder chamber above said first piston when in its lowermost position and a piston chamber between the heads of the two pistons when farthest apart, a cap closing the head end of the cylinder to form a compression chamber above the cylinder, a checked inlet in said cap, there being a passage from said compression chamber through the head of said first piston into said piston chamber and through exhaust ports in the cylinder wall when the piston heads are farthest apart, the strokes of the two pistons being proportioned to produce a piston displacement volume in said cylinder chamber somewhat greater than the volume of said piston chamber, the volume of said compression chamber being of a size to produce sufficient pressure completely to scavenge said piston chamber through the said passage and ports.

WILLIAM L. SCHMITZ.